3,156,087
COMBINED RIVET PUNCH AND SPINNER
Elof Granberg, Richmond, Calif., assignor, by mesne assignments, to Firmont Inc., Richmond, Calif., a corporation of California
Filed July 11, 1960, Ser. No. 42,038
5 Claims. (Cl. 59—7)

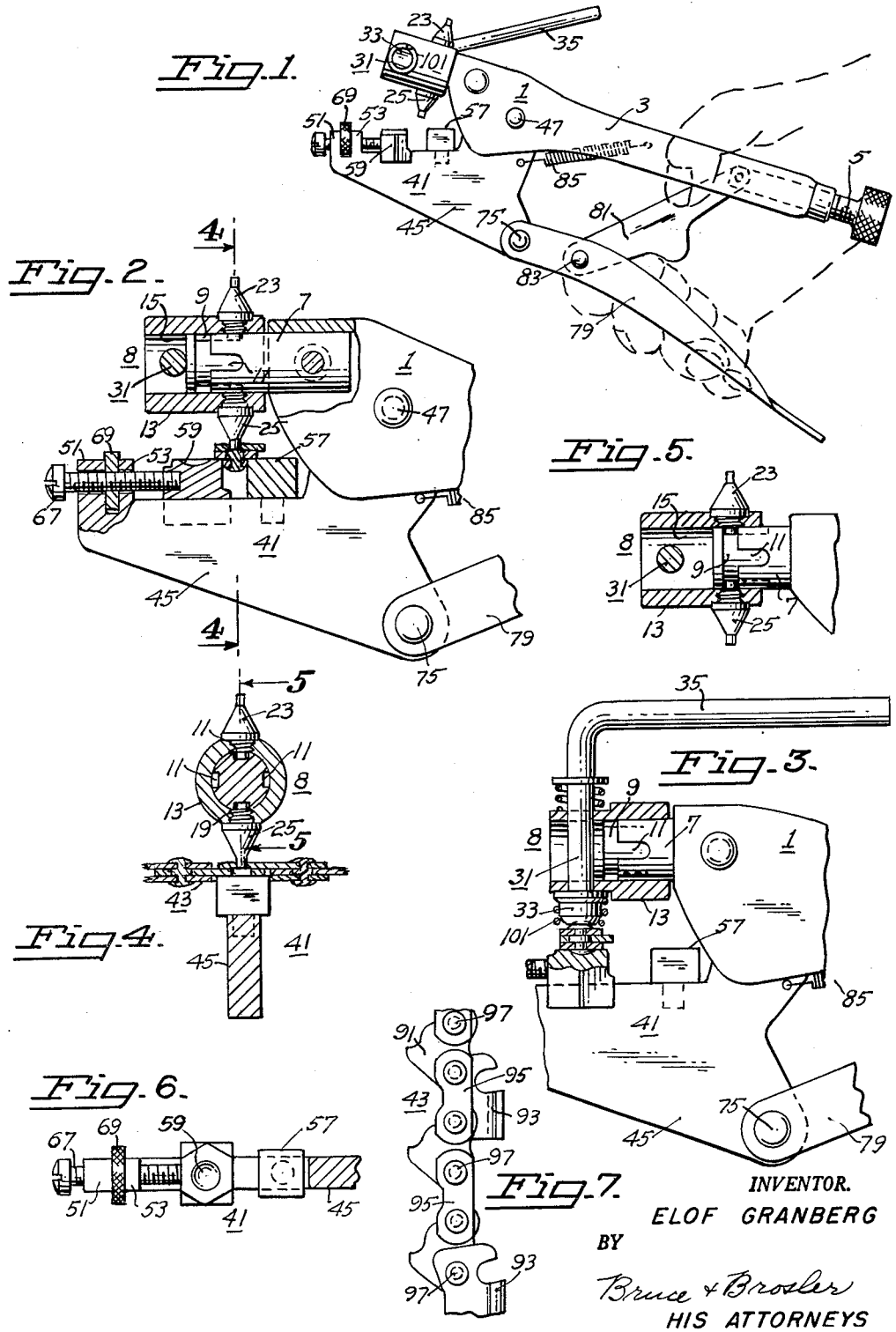

My invention relates to chain saws and more particularly to a tool for servicing the saw chain of such a saw.

In the use of chain saws, it frequently happens that a cutter tooth or other component part of the chain becomes damaged to the extent of either necessitating replacing the same or buying a new saw chain. Where such component is replaceable, the cost of repairing a chain represents but an insignificant part of the cost of a new chain and is therfore the more economical solution to the problem.

A saw chain is made up of drive links, cutter teeth and side straps, freely held together by rivets. To service a chain therefore, requires first breaking it as by removing a rivet or two, to eliminate faulty or damaged cutter tooth or drive link, and following replacement of a new one, then spinning new rivets or sometimes the old rivets into position.

While certain tools have been developed for this purpose, the present invention offers definite improvements thereover and has for its objects:

(1) To provide a novel and improved tool for servicing of saw chains;

(2) To provide a novel and improved tool for servicing of saw chains, which tool shall provide a more secure support for a saw chain being serviced;

(3) To provide a novel and improved tool for servicing of saw chains, which tool will enable greater mechanical advantage in the initial portion of an operation when the greatest application of force is required;

(4) To provide a novel and improved tool for servicing of saw chains, which tool will accommodate saw chains of different make and size;

(5) To provide a novel and improved tool for servicing of saw chains, which tool will permit of a smoother and more efficient operation in the spinning of rivets to secure the component parts in functional relationship to each other;

(6) To provide a novel and improved tool for servicing of saw chains, which tool may be accurately adjusted with respect to the chain rivets to be operated on;

(7) To provide a novel and improved tool for servicing of saw chains, which tool enables all operations on a chain to be conveniently handled by one individual;

(8) To provide a novel and improved tool for servicing of saw chains, components of which tool are replaceable or adjustable to effect a long tool life.

Additional objects of my invention will be brought out in the following description of a preferred embodiment, taken in conjunction with the accompanying drawings, wherein:

FIG. 1 is a side view in elevation of the tool of the present invention;

FIG. 2 is a fragmentary view of the tool of FIG. 1, partly in section and depicting one manner of use;

FIG. 3 is a corresponding fragmentary view depicting the tool performing a different but related operation;

FIG. 4 is a view in section taken in the plane 4—4 of FIG. 2;

FIG. 5 is a view in section taken in plane 5—5 of FIG. 4;

FIG. 6 is a plan view of an anvil assembly of FIGS. 2 and 3; and

FIG. 7 is a plan view of a section of representative saw chain with which the present invention deals.

Referring to the drawings for details of my invention in its preferred form, the tool of the present invention comprises a lever 1 including a hand grip 3 which at its end carries a longitudinally mounted adjusting screw 5, and at the other end of the lever, the lever terminates in a substantially longitudinal directed cylindrical mounting stem 7 for a punch head assembly 8. The mounting stem is preferably formed with a circular groove 9 adjacent its free end, and four equally spaced longitudinal grooves 11 extending from the circular groove toward the anchored end of the stem.

The punch head assembly includes a cylinder 13 having a central longitudinal passage 15 to frictionally fit the mounting stem 7 and permit assembly of the cylinder onto the stem. In this cylinder are provided diametrically disposed threaded radial openings 19 intersecting the central passage 15, such threaded radial openings being for the purpose of receiving and securing a pair of shouldered punches 23, 25 of different tip diameter, each punch having a threaded securing stem sufficiently long to engage in one of the longitudinal grooves 11 of the mounting stem without bottoming therein to assure shoulder engagement with the cylinder, the punches thereby serving to cooperate with the mounting stem in precluding rotation of the punch head assembly, while permitting longitudinal adjustment of the punch head assembly on the mounting stem.

Normal to the diameter on which the punches have been positioned, but preferably in a different plane, is a rivet spinner 31 including at one end, a spinner head 33 and at its opposite end, a handle 35 for manually rotating the spinner head. The face end of the spinner head is ground or recessed along a diameter thereof to more effectively perform its function in spinning a rivet.

By withdrawing the punch head assembly until the stem ends of the punches enter the circular groove 9, the punch head assembly may be rotated to shift the punches out of functioning position and at the same time position the spinner in position for use, following which the punch head assembly may be returned to its non-rotatable position, the punch stems occupying a different set of longitudinal grooves for preventing such rotation.

Below the punch head assembly is an anvil assembly 41 for cooperation therewith in the servicing of a saw chain 43. This anvil assembly includes a jaw 45 pivotally secured to the lever 1 by a pivot pin 47 intermediate the hand grip 3 and the punch head assembly mounting stem 7, and extending beyond the free end of the mounting stem, the jaw terminating at its extremity in a pair of parallel upstanding ears 51, 53.

Carried by the jaw is a split anvil including a fixed anvil component 57 in proximity to the jaw pivot pin 47, and an adjustable anvil component 59 slidably mounted on the upward edge of the jaw with its anvil surface in the plane of the anvil surface of the fixed component.

The fixed component is preferably of square shape, provided with a stem which is press fitted into a hole formed in the jaw. Such manner of anchoring the fixed component permits this component part of the anvil to be driven from its anchorage when desired, to enable the same being rotated 90 degrees and replaced, so as to present a new edge to the other component of the anvil assembly when the edge in use becomes worn or deformed to the point of losing its usefulness.

The slidable component of the anvil assembly is made adjustable as to its position along the upper edge of the jaw and with respect to the fixed component, by an adjusting screw 67 passing freely through the parallel ears and carrying an adjusting nut 69 threadedly mounted thereon between the ears, the inner end of the screw being threaded into the shiftable component of the anvil assembly, whereby to control movement thereof with rotation of the adjusting nut.

Pivotally secured to the jaw by a pivot pin 75 located substantially below the pivot pin 47 on which the jaw pivots, is a second hand grip 79 to function in cooperation wtih the first hand grip 3, in bringing the punch head assembly and the anvil assembly together.

Toward this end, a connecting lever 81 is connected at one end by a pin 83 to the second hand grip, at an intermediate point thereon, while at its other end, this connecting lever hingedly connects to the inner end of the adjusting screw 5 mounted in the end of the first hand grip. A tension spring 85 anchored at one end to the first hand grip 3 at an intermediate point thereof, connects at its other end to the jaw, at a point between the jaw pivot pin 47 and the second hand grip pivot pin 75, such spring, under tension, serving to restore the jaw to its "open" or spaced position with respect to the punch head assembly.

Saw chains are of different sizes and design, but in general such a chain will include drive links 91, cutter teeth 93 and side straps 95, all held together by solid rivets 97, the rivets in most chains being shoulder rivets, against the shoulders of which the drive links and side straps are held by the rivet heads.

In employing the tool in the servicing of a saw chain, the chain is placed across the split anvil which is adjusted to comfortably receive the side strap between the anvil components, and the punch head is slidably adjusted on its mounting stem so as to bring the pertinent punch into alignment with the rivet to be removed. With the anvil assembly and the punch head assembly thus adjusted to the particular chain to be serviced, the punch is forced down against the rivet head with sufficient pressure to drive the rivet out of the chain. If an entire cutter tooth or drive link is to be removed, a second rivet will similarly be driven out, so as to free such tooth or link from the chain for substitution of a corresponding element.

The punch head assembly is then shifted sufficiently to permit rotation thereof through 90 degrees to bring the spinner head into operating position, following which the same is shifted back to its non-rotatable condition. With the spinner head aligned with the adjustable component of the anvil assembly, a new rivet is passed through the aligned openings in the chain elments to be riveted and then positioned with the preformed head of the rivet on the adjustable anvil component, following which the spinner head is brought down into pressure contact with the exposed end of the rivet to be spun.

A coil spring 101, anchored about the spinner head and extending a turn or two beyond the end of the spinner head, is adapted to engage the saw chain in advance of the spinner head and hold the loose chain components in proper engagement for riveting. While the chain is thusly held, the spinner head is manually rotated while held in pressure engagement with the exposed end of the rivet to be spun, to produce a gradual flaring of the end of the rivet until maximum overturn of metal of the rivet is realized without binding any of the riveted components.

Aside from the punch head assembly and the split anvil assembly, the tool bears considerable similarity to a tool known in the trade as a "vise grip pliers." In such tool, a pair of jaws function in place of the punch head assembly and split anvil assembly of the persent invention, and manipulation of the adjusting screw will cause the cooperating jaws to approach or recede from each other. By thus adjusting the spacing between the jaws to approach the size of a nut or corresponding element to which the pliers is to be applied and thereafter by bringing the two hand grips toward each other, the jaws of the pliers may be locked to such element. This is the sole function of the adjusting screw in the tool known as a "vise grip pliers."

In the tool of the present invention, this adjusting screw performs an additional function, which is quite vital in the use of such tool. I have discovered, for example, that changes in the angular position of the connecting lever 81 with rotation of the adjusting screw 5 changes the mechanical advantage of the tool, that is, as the adjusting screw is adjusted outwardly, greater leverage is offered by reason of the shallower angle which the connecting lever 81 makes with the second hand grip 79.

Accordingly, instead of threading the adjusting screw all the way in and attempting to punch out a rivet in one operation with the minimum leverage provided by such adjustment, it is possible to perform the operation in two or more steps starting with an adjustment of the adjusting screw such as will allow but limited penetration of the punch into the rivet sufficient to break through the spun head end thereof. Since this step in the operation requires the greatest amount of pressure, it will be apparent that the tool offers the maximum leverage and therefore, maximum mechanical advantage under the circumstances when most needed.

Further adjustments of the screw 5 can be made in large or small increments of adjustments as may be desirable, until the rivet is completely driven out of the chain. Similar progressive adjustments of the adjusting screw may be resorted to if desired, in the operation of spinning a new rivet into position.

While the punch head assembly and anvil assembly have, in the preferred form of the invention, been illustrated as component parts of a hand tool, these assemblies may be embodied in an arbor type tool or in the other associations which can bring about the necessary cooperation between such assemblies.

From the foregoing description of my invention in its preferred form, it will be apparent that the same fulfills all the objects thereof, and while I have illustrated and described the same in considerable detail, it will be apparent that the same is subject to alteration and modification without departing from the underlying principles involved, and I accordingly do not desire to be limited in my protection to the specific details so illustrated and described except as may be necessitated by the appended claims.

I claim:

1. A saw chain service tool comprising a lever including a hand grip, at one end having an adjusting screw and at its other end terminating in a mounting stem for a punch head assembly; a punch head assembly rotatably mounted on said stem, said punch head assembly including a punch and a rivet spinner; an anvil assembly for cooperation with said punch head assembly, said anvil assembly including a jaw pivotally secured to said lever intermediate said hand grip and said punch head assembly mounting stem and extending below said mounting stem, a split anvil carried by said jaw, said split anvil including a fixed anvil component, an adjustable anvil component slidably mounted on said jaw, and means for adjusting said adjustable anvil component with respect to said fixed anvil component from a position in cooperation with said fixed component for supporting a chain in line with said punch, to a position in line with said rivet spinner; a second and cooperating hand grip pivotally secured to said jaw; an adjusting lever connected at one end to said second hand grip at an intermediate point thereof, and at its other end to said first hand grip mounted adjusting screw; and a tension spring anchored at one end to said first hand grip at an intermediate point thereof and at its other end to said jaw.

2. A saw chain service tool comprising a lever including a hand grip, at one end having an adjusting screw and at its other end terminating in a substantially longitudinally directed mounting stem for a punch head assembly; a punch head assembly rotatably mounted on said stem, said punch head assembly including a punch threadedly secured therein and adapted to engage said mounting stem to preclude rotation of said punch head assembly, and a rivet spinner rotatably mounted therein and including at one end a spinner head and at its opposite end a handle for manually rotating said spinner head; an anvil assembly for cooperation with said punch head assembly, said anvil assembly including a jaw pivotally secured to said lever intermediate said hand grip and said punch head assembly mounting stem and extending below said mounting stem, a split anvil carried by said jaw, said split anvil including a fixed anvil component, an adjustable anvil component slidably mounted on said jaw, and means for adjusting said adjustable anvil component with respect to said fixed anvil component from a position in cooperation with said fixed component for supporting a chain in line with said punch, to a position in line with said rivet spinner; a second and cooperating hand grip pivotally secured to said jaw; an adjusting lever connected at one end to said second hand grip at an intermediate point thereof, and at its other end to said first hand grip mounted adjusting screw; and a tension spring anchored at one end to said first hand grip at an intermediate point thereof and at its other end to said jaw.

3. A saw chain service tool comprising a lever including a hand grip, at one end having an adjusting screw and at its other end terminating in a substantially longitudinally directed mounting stem for a punch head assembly; a punch head assembly mounted on said stem, said punch head assembly including a cylinder having a longitudinal passage to receive said stem and permit assembly of said cylinder on said stem, diametrically disposed threaded radial openings to said longitudinal passage, a punch threadedly secured in each of said radial openings and adapted to engage said mounting stem to preclude rotation of said cylinder, a rivet spinner rotatably mounted in said cylinder on a diameter normal to that of said punches and including at one end a spinner head and at its opposite end, a handle for manually rotating said spinner head; an anvil assembly for cooperation with said punch head assembly, said anvil assembly including a jaw pivotally secured to said lever by a pivot pin intermediate said hand grip and said punch head assembly mounting stem and extending below said mounting stem, said jaw terminating in a pair of parallel ears, a split anvil carried by said jaw, said split anvil including a fixed anvil component in proximity to said jaw pivot pin and an adjustable anvil component slidably mounted on the upper edge of said jaw, and an adjusting screw for said adjustable anvil component passing freely through said pair of parallel ears and anchored to said adjustable anvil component, and an adjusting nut threadedly mounted on said adjusting screw between said ears; a second and cooperating hand grip pivotally secured to said jaw by a pivot pin; an adjusting lever connected at one end by a pin to said second hand grip at an intermediate point thereof, and at its other end to said first hand grip mounted adjusting screw; and a tension spring anchored at one end to said first hand grip at an intermediate point thereof and at its other end to said jaw at a point between the jaw pivot pin and the second hand grip pivot pin.

4. A saw chain service tool comprising a lever including a hand grip, at one end having a longitudinally mounted adjusting screw and at its other end terminating in a substantially longitudinally directed mounting stem for a punch head assembly, said mounting stem having a circular groove adjacent its free end and four equally spaced longitudinal grooves extending normal thereto; a punch head assembly mounted on said stem, said punch head assembly including a cylinder having a longitudinal passage to receive said stem and permit assembly of said cylinder on said stem, diametrically disposed threaded radial openings to said longitudinal passage, a punch having a securing stem threaded in each of said radial openings and of a length adapted to enter one of said longitudinal grooves to preclude rotation of said cylinder, a rivet spinner rotatably mounted in said cylinder on a diameter normal to that of said punches and including at one end a spinner head and at its opposite end, a handle for manually rotating said spinner head; an anvil assembly for cooperation with said punch head assembly, said anvil assembly including a jaw pivotally secured to said lever by a pivot pin intermediate said hand grip and said punch head assembly mounting stem and extending below said mounting stem, said jaw terminating in a pair of parallel ears, a split anvil carried by said jaw, said split anvil including a fixed anvil component in proximity to said jaw pivot pin and an adjustable anvil component slidably mounted on the upper edge of said jaw, and an adjusting screw for said adjustable anvil component passing freely through said pair of parallel ears and anchored to said adjustable anvil component, and an adjusting nut threadedly mounted on said adjusting screw between said ears; a second and cooperating hand grip pivotally secured to said jaw by a pivot pin; an adjusting lever connected at one end by a pin to said second hand grip at an intermediate point thereof, and at its other end to said first hand grip mounted adjusting screw; and a tension spring anchored at one end to said first hand grip at an intermediate point thereof and at its other end to said jaw at a point between the jaw pivot pin and the second hand grip pivot pin.

5. A chain saw service tool comprising a punch head assembly including a punch, and a rivet spinner in spaced relationship to said punch; an anvil asesmbly for supporting a saw chain to be serviced, said anvil assembly including an anvil support, a pair of anvil components on said support adapted to cooperate in supporting a chain in line with said punch, for punching of a rivet from such chain; means for adjusting at least one of said anvil components with respect to the other component from said cooperating position to a position in line with said rivet spinner for the spinning of a rivet in such chain; and means for bringing said punch head assembly and said anvil assembly together.

References Cited in the file of this patent
UNITED STATES PATENTS

| | | |
|---|---|---|
| 433,786 | Hooks | Aug. 5, 1890 |
| 974,368 | Eaton | Nov. 1, 1910 |
| 1,024,728 | Jackson | Apr. 30, 1912 |
| 1,130,121 | Thrasher | Mar. 2, 1915 |
| 1,179,565 | Risden | Apr. 18, 1916 |
| 2,589,511 | Redmon | Mar. 18, 1952 |
| 2,661,112 | Davis | Dec. 1, 1953 |